United States Patent [19]

Ivy

[11] Patent Number: 4,863,420
[45] Date of Patent: Sep. 5, 1989

[54] VEHICULAR TRACK DRIVE ASSEMBLY

[76] Inventor: Jessie T. Ivy, 686 W. Shore Dr., Anacortes, Wash. 98221

[21] Appl. No.: 21,224

[22] Filed: Mar. 3, 1987

[51] Int. Cl.⁴ ............................................. F16H 55/00
[52] U.S. Cl. ..................................... 474/901; 305/40; 474/203
[58] Field of Search ............... 474/153, 154, 203, 204, 474/901; 305/39, 40, 56, 57, 35 R, 35 EB; 198/834, 835

[56] References Cited

U.S. PATENT DOCUMENTS 636,138  10/1899  Hatfield ................................ 474/203
1,267,825  5/1918  Trigwell ................................ 305/40

Primary Examiner—Thuy M. Bui

[57] ABSTRACT

A sprocket and drive assembly for a tracked vehicle which includes individual track segments. Each track segment includes a rounded portion in the form of a number of spheres or a single cylinder, which is secured to an endless cable. The sprocket has a number of circumferential recesses in the form of cylindrical troughs or concave pockets. Rotation of the sprocket drives the track segments via the drive members which are engaged within the complementary shaped recesses of the sprocket.

2 Claims, 4 Drawing Sheets

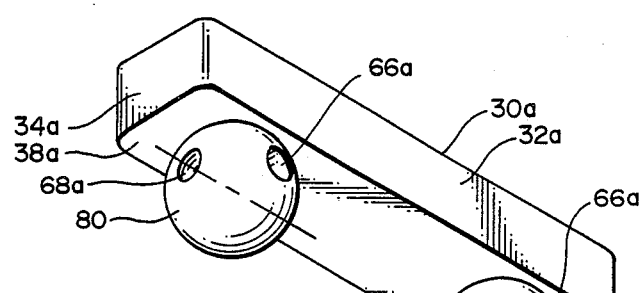
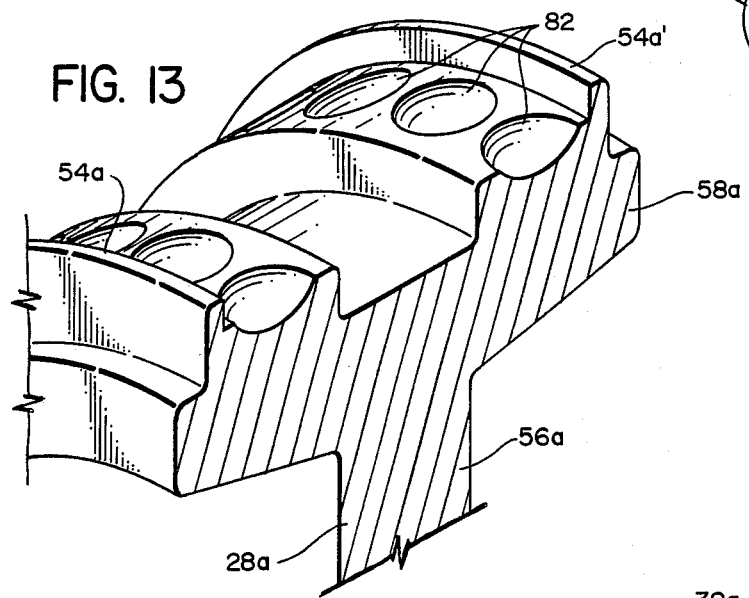
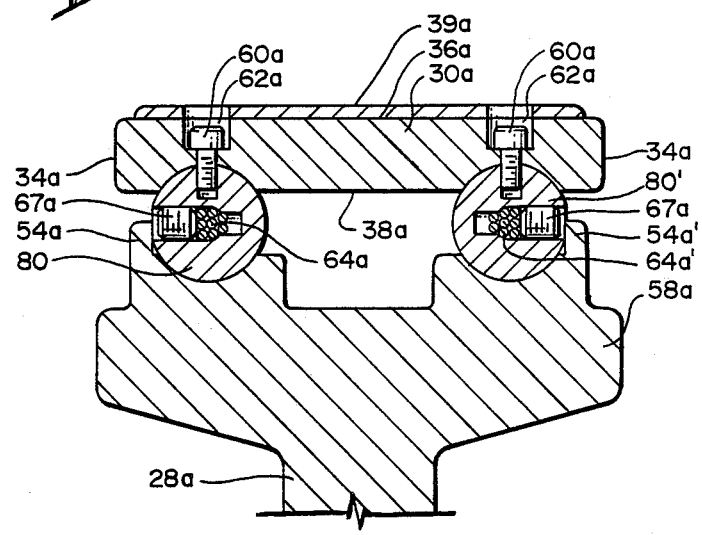

VEHICULAR TRACK DRIVE ASSEMBLY

TECHNICAL FIELD

The present invention pertains to a sprocket and track drive assembly for a vehicle such as a tank.

BACKGROUND OF THE INVENTION

Track assemblies for vehicles such as bulldozers and tanks are well-known. Typically, each track is formed into an endless belt by a number of individual track segments which are connected to one another. The track is mounted about a number of drive sprockets which receive power from the vehicle engine through a transverse extending axle connected to the sprockets. The sprocket teeth engage the track segments in order to rotate the track.

For example, in U.S. Pat. No. 2,803,504 by Lynch there is disclosed a segmented drive track in which each track segment is connected together by a rubberized tension band and the track is driven by a sprocket which engages a number of guides which extend inward from the track segments.

Other vehicle drive assemblies have also been disclosed. In U.S. Pat. No. 534,442 by Linn, there is disclosed a vehicle drive mechanism which includes a number of balls contained in an endless conduit and which are driven through the conduit by a scalloped drive sprocket so as to drive the vehicle when the balls engage the underlying ground or a track.

Endless drive assemblies including a number of balls which are mounted to an endless cable and which engage a sprocket having pockets or recesses located about its circumference, have been disclosed in U.S. Pat. Nos. 145,447 by Reigart; 4,214,488, and 4,315,751 by Conrad; 3,091,030 and 3,041,887 both by Zumbrunnen; and 636,138 by Hatfield.

Other endless belt drive assemblies having balls mounted to a cable include U.S. Pat. Nos. 332,672 by Mellette et al; 620,169 by Paulson; and 3,517,565 by Smith.

Additional endless belt drive assemblies are disclosed in Pat. No. 1,756,136 by Ryther, which pertains to a conveyor chain which is formed by a number of chain segments which are connected together by coupling devices which engage the recesses of a drive sprocket.

In Berg, U.S. Pat. No. 3,748,917 there is disclosed a transmission belt system including a number of cogged wheels which engage pin elements which are attached to and extend perpendicularly from a supporting endless cable. In a similar manner, Wenborne, in U.S. Pat. No. 268,965 discloses a drive assembly including a number of disc elements which are attached to and extend perpendicularly from an endless belt and which engage the teeth of a sprocket.

Another drive assembly is shown in U.S. Pat. No. 276,619 by Mills, which discloses a number of expanded sleeve elements which are secured to a rope and extend perpendicularly therefrom to engage a sprocket.

SUMMARY OF THE INVENTION

The present invention pertains to a drive assembly for a tracked vehicle. The drive assembly includes an endless track formed by a plurality of individual track segments, each having a ground engaging surface and a second surface. A drive member is connected to and extends from the second surface of the track segment and has a rounded outer surface. At least one cable is provided for interconnecting the drive members to form the endless track. The rounded drive members are fastened to the cable in a manner that each drive member touches an adjacent drive member, and so that the drive members are prevented from moving along the cable.

The drive assembly further provides at least one sprocket which is connected to an axle of the vehicle and which is driven by the vehicle engine. The sprocket engages the drive members of the track to rotate the track and propel the vehicle. The sprocket includes an outer circumferential surface having at least one rounded recess formed therein to engage the rounded drive member and to transmit a drive force from the sprocket to the track.

It is an object of the present invention to provide a sprocket and drive assembly for a tracked vehicle.

BRIEF DESCRIPTION OF THE DRAWINGS

These and other objects and advantages of the present invention will become more readily apparent upon reading the following Detailed Description and upon reference to the attached Drawings in which:

FIG. 12 is an isometric view of a second embodiment of the present invention showing individual spheres mounted to the lower surface of a track segment;

FIG. 13 is an isometric view of the sprocket including individual pockets for engaging the spheres shown in FIG. 12; and FIG. 14 is a sectional view of the second embodiment similar to the view shown in FIG. 6 of the first embodiment.

Figure 1:
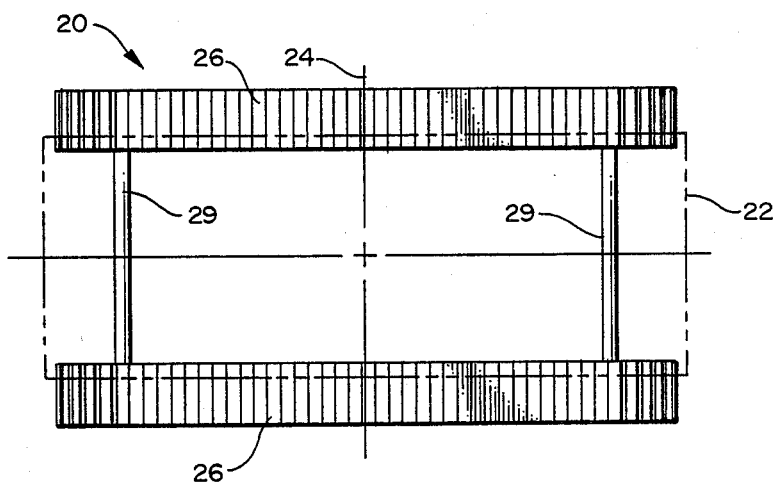
FIG. 1 is a bottom view of a vehicle propelled by the drive track assembly of the present invention.

While the present invention is susceptible to various modifications and alternative forms, specific embodiments thereof have been shown by way of example in the Drawings and will herein be described in detail. It should be understood, however, that it is not intended to limit the invention to the particular forms disclosed, but on the contrary, the invention is to cover all modifications, equivalents and alternatives falling within the spirit and scope of the invention.

DETAILED DESCRIPTION

Figure 2:
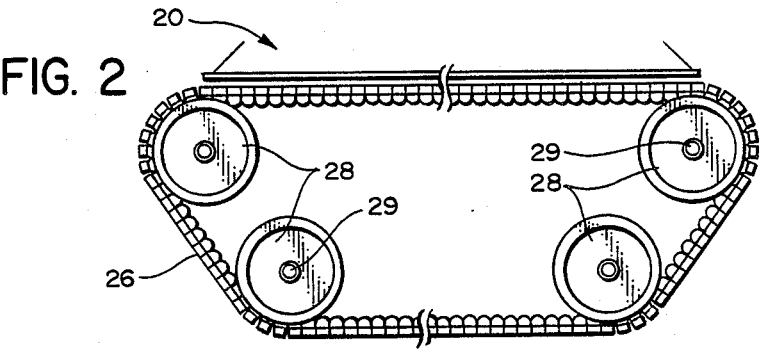
FIG. 2 is a side view of the vehicle propelled by the drive track assembly of the present invention.

In order to describe the drive track assembly of the present invention, reference is made to FIGS. 1 and 2 where there is shown a vehicle generally indicated at 20 having a lengthwise axis designated by a line 22 and a transverse axis designated by a line 24. The vehicle is driven by a pair of endless tracks 26 which are connected to the vehicle in a lengthwise manner about a number of drive sprockets 28. Power to the drive sprockets is provided by a vehicle engine (not shown) which drives a pair of transverse extending drive axles 29 which in turn are connected to the centers of the sprockets 28. As shown more clearly in FIGS. 3 and 4, the tracks 26 are formed by a number of individual track segments 30 having vertical sides 32 which are parallel to the transverse axis, opposing vertical end surfaces 34 which are parallel to the longitudinal axis 22, an outer horizontal planar surface 36 (FIG. 3) which engages the ground to drive the vehicle, and an inner surface 38 which is parallel to the outer surface 36.

In an exemplary embodiment, a rubber or plastic pad 39 (FIG. 6) is attached to the track outer surface 36. The pad 39 permits the vehicle to travel over hard surfaces such as cement without damaging the track segments 30.

In order to attach the track segments 30 about the drive sprockets 28, a rounded drive member 40 is mounted to the inner surface 38 of each track segment to engage a complementary shaped recessed portion of the sprocket. In a preferred embodiment, the drive member 40 and the sprocket recessed portion are made from a plastic such as nylon.

Figure 4:
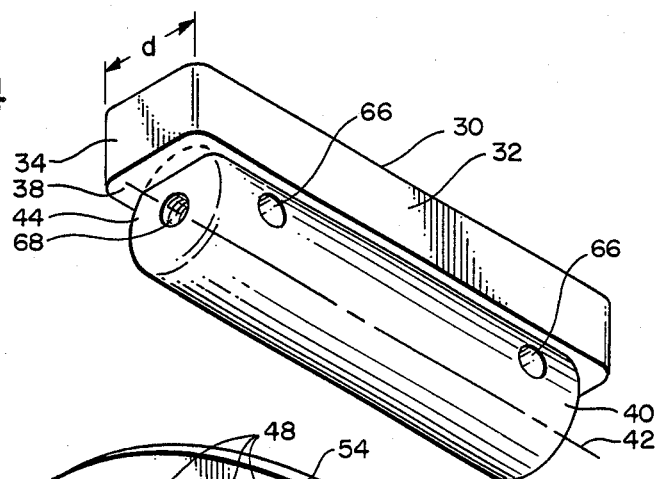
FIG. 4 is an isometric view of a first embodiment of the present invention showing a drive track segment attached to a cylindrical drive member.
Figure 5:
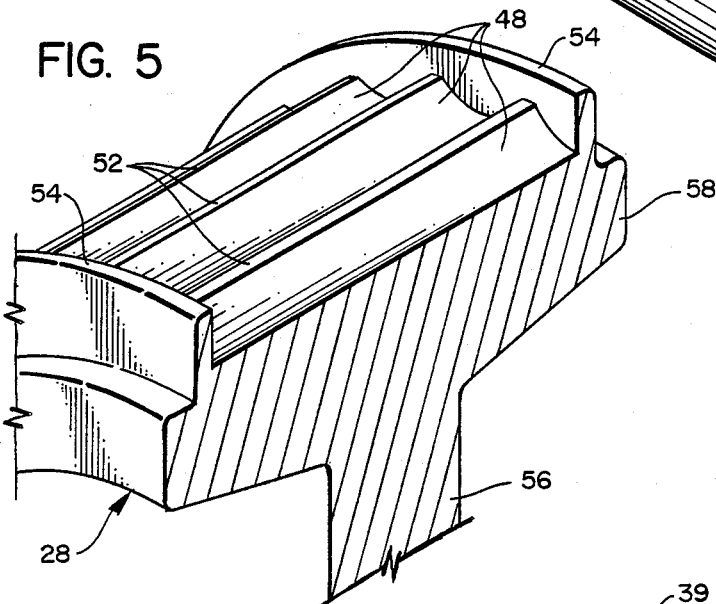
FIG. 5 is a partial isometric view of the outer surface of the drive sprocket for engaging the cylindrical drive member shown in FIG. 4.

In the first exemplary embodiment shown in FIGS. 4 through 7, the rounded drive member 40 has a cylindrical configuration which terminates at opposite ends 44 slightly inboard of the track segment end surfaces 34. More specifically, each drive member 40 has a main axis designated by a line 42 which is parallel to the vehicle transverse axis 24. The drive member 40 is formed in a cylinder about the main axis 42. In order to receive the cylindrical members 40, each sprocket 28 includes a number of concave troughs 48 (FIG. 5) which are located about the outer circumference of the sprocket. Each trough is bounded at either side by a narrow ridge 52. In this embodiment, the troughs 48 extend in a lengthwise direction as shown in FIG. 5, parallel to the vehicle transverse axis 24, and terminate at opposite sidewalls 54 which extend circumferentially about the sprocket 28 and extend vertically above the ridges 52. The cylindrical drive members 40 are accommodated within the sprocket troughs 48.

Figure 3:
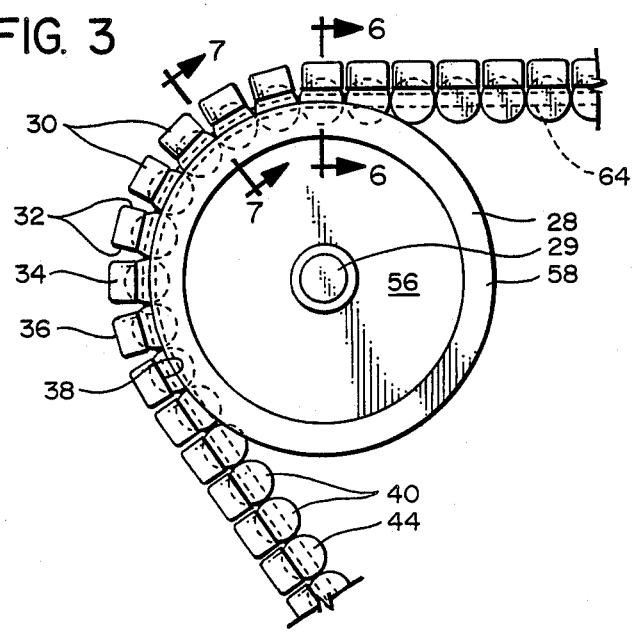
FIG. 3 is a partial side view of the drive track assembly showing the drive sprocket and a portion of the drive track.

As shown in FIGS. 3 and 5, each sprocket 28 is formed by an inner radial neck 56 which is mounted about the shaft 29, and an outer radial shoulder 58 which flares outwardly in a transverse direction to provide a base for the troughs 48.

. In order to carry out the present invention, the drive members 40 are mounted to the track segments 30 by means of threaded screws 60 (FIG. 6), each of which extends through a counterbored vertical passageway 62 in the outer surface 36 of each track segment and into the drive member 40. More particularly, the drive members 40 are mounted within complementary shaped concave recesses in the lower surfaces 38 (FIGS. 6 and 7) of the track segments.

Figure 6:
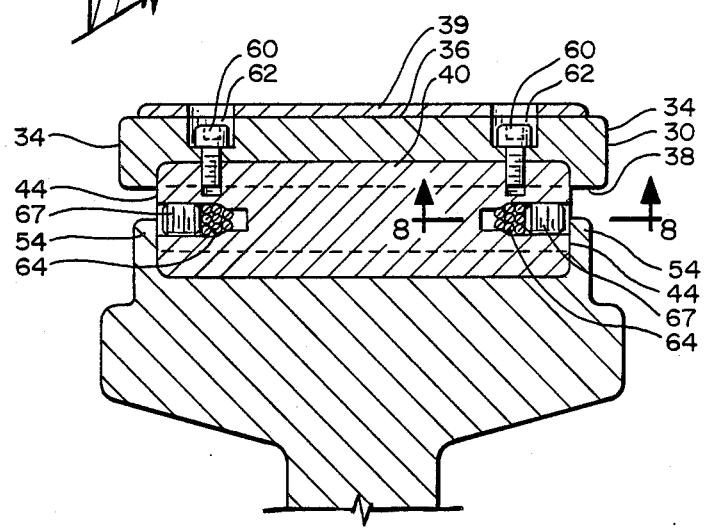
FIG. 6 is a sectional view, taken along lines 6—6 of FIG. 3, of the drive member engaged to the sprocket.
Figure 7:
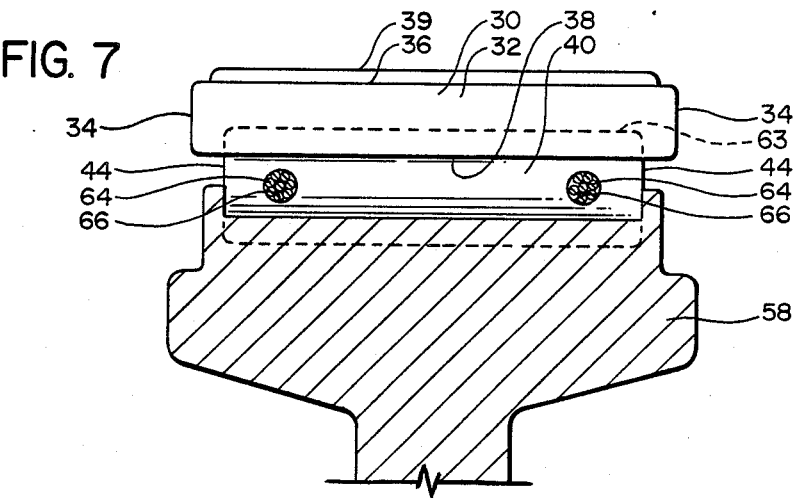
FIG. 7 is a sectional view, of the drive member taken along lines 7—7 of FIG. 3, engaged to the drive sprocket.
Figure 8:
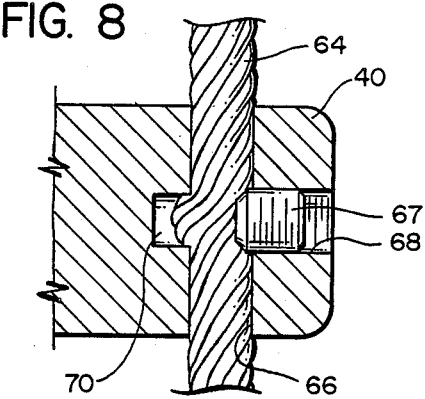
FIG. 8 is a sectional view taken along lines 8—8 of FIG. 6 of the cylindrical drive member connected to an endless cable.

To form an endless track assembly, the drive members 40 are interconnected by a pair of endless flexible cables 64 (FIGS. 4 and 6). The cables are engaged within respective passageways 66 which extend through the drive members 40 slightly inboard of the end surfaces 44 in a manner parallel to the track upper surface 36. The drive members 40 are rigidly secured on the cables 64 by threaded set screws 67 (FIG. 6) which are engaged in threaded passageways 68. Passageways 68 extend through the endwalls 44 of the drive member 40 to be in communication with the passageway 66 so that the inner end of the set screw 67 engages the cable. As shown more clearly in FIG. 8, the passageway 68 includes an end portion 70 which is both normal to and in communication with passageway 66 at a location opposite from the set screw 67. In this manner, when the set screw 67 is rotated inward toward the cable 64, the portion of the cable engaged by the screw 67 is displaced into the recessed end portion 70 to prevent movement of the drive member 40 and track segment therewith along the cable. This also removes any slack which may be present in the cable due to stretching of the cable so as to maintain the adjacent drive members 40 in touching engagement. The amount of slack removed is a function of the position of screw 67 and resulting displacement of cable 64.

Figure 9:
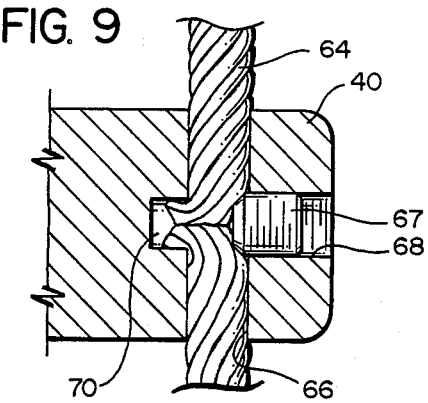
FIG. 9 is a sectional view similar to the view taken along lines 8—8 and showing the connection of two ends of the cable to form an endless cable.

In the present invention, the cable 64 is formed into an endless loop as shown in FIG. 9 by positioning the ends of the cable 64 between the set screw 67 and the end portion 70. Inward rotation of the set screw 67 displaces the cable ends into the end portion 70 and secures them therein. Furthermore, in the event the roller 64 is accidentally severed, the ends can be rejoined as shown in FIG. 9, or a new length of cable can be easily installed.

Figure 11:
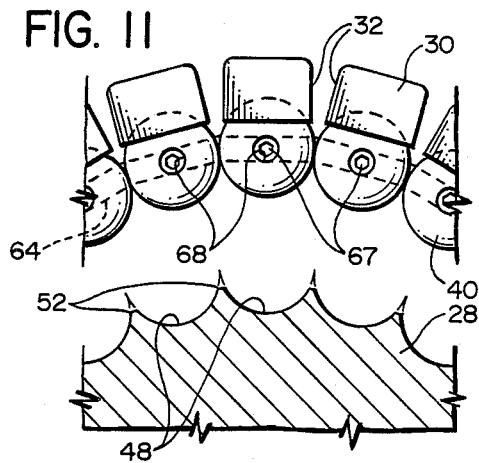
FIG. 11 is a side view showing the position of the cylindrical drive members when engaged around the sprocket, with the cylindrical drive members being spaced apart from the sprocket for ease of illustration.

The present invention is advantageously carried out by securing the drive members 40 to the cable 64 so that the outer rounded surfaces of the engaging members 40 are in a touching relationship as shown in FIG. 11. In this manner, each drive member 40 is not only secured against displacement along the cable by the set screws 67, but also by the remaining drive members which are secured to the cable and which are in touching relationship about the entire length of the cable. Thus, displacement of the drive members 40 along the cable 64 when engaged by the sprockets 28 is resisted by the remaining drive members secured to the cable.

Figure 10A:
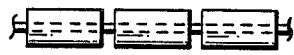
FIGS. 10A and 10B are simplified diagrams of prior art cable and track assemblies.
Figure 10B:
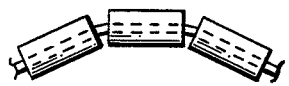

Unlike the present invention, many conventional track assemblies are formed by individual track segments which are interconnected with one another as shown in FIG. 10A. These track segments, which have rectangular cross-sectional configurations, are typically spaced apart from one another in an end-to-end relationship. This spacing is necessitated, for one reason, by the fact that when the track segments are rotated about the sprocket, the lower corners of the segments tend to rotate inward toward each other as shown in FIG. 10B.

In the present invention, the diameter (FIG. 11) of each drive member 40 is greater than the width of the track segment 30 as measured between the sides 32 of the track segments. This permits the drive members 40 to be located snugly against one another on the cable as discussed previously, while providing sufficient clearance between the track segments 30 to permit them to rotate about the sprocket. Since the drive members have rounded outer surfaces, during bending of the cable as the drive members are carried around the sprocket, the cylinders are permitted to roll slightly inward toward each other.

In another embodiment of the present invention shown in FIGS. 12 through 15, like elements described in previous embodiments are designated by like numerals with the suffix "a" attached. In the present embodiment, each track drive member is formed by a pair of spheres 80, 80', which replace each cylindrical member 40 described in the previous embodiment. The spheres 80, 80' are connected to the lower surfaces 38a of the track segment 30a slightly inboard of the track segment ends 34a in the same manner the cylindrical drive members were attached in the previous embodiment. Likewise, the spheres 80, 80' are supported on the cable 64a (FIG. 14) in the manner described in the previous embodiment.

In order to engage the spheres 80, 80' to the drive sprocket 28a, the outer surface of the sprocket shoulder 58a (FIG. 13) includes a number of concaved shaped pockets 82 which are formed at adjacent first circumferential locations slightly inboard of one sidewall 54a, and at adjacent second circumferential locations slightly inboard of the opposite sidewall 54a'. In this manner, the spheres 80, 80' are engaged within the pockets 82 to rotate the track segments 30a.

What is claimed is:

1. Drive apparatus for a tracked vehicle having a lengthwise axis and a transverse axis, said drive apparatus comprising:
   a. track means including
      (1) a plurality of individual track segments, each having a first ground engaging surface and a second surface,
      (2) a plurality of drive members, each having a rounded outer surface, and being connected to and extending from the second surface of said track segment, each drive member including a first passageway extending therethrough,
      (3) cable means which extend through said first passageway for interconnecting said drive members to form said track means, and
      (4) means for fixedly connecting said drive members to said cable means so that each drive member touches an adjacent drive member and so that said drive members are prevented from moving relative to said cable means;
   b. sprocket means which are operatively connected to said vehicle and which include a rotatable sprocket member which engages said drive member to rotate said track means, said sprocket member including an outer circumferential surface having a plurality of rounded recesses formed therein for receiving said drive members to transmit a drive force from said sprocket means to said track means;
   c. each of said track segments having a width dimension which is measured generally along the lengthwise axis;
   d. each of said drive members having an outer surface formed in a circular configuration of a predetermined diameter about an imaginary axis which is generally parallel to the transverse axis;
   e. the drive members being connected to the cable means so the outer surfaces of adjacent drive members are in touching engagement; and
   f. the diameters of the drive members being greater than the width dimensions of the track segments so that when the adjacent drive members are in touching engagement, the adjacent track members are spaced apart from each other to permit their rotation about said sprocket means.

2. The drive apparatus as set forth in claim 1 wherein said connecting means includes
   a. a second passageway in said drive member which is generally perpendicular to and in communication with said first passageway, said second passageway including an upper passageway portion which extends between the outer surface of said drive member and said first passageway, and a lower passageway portion which is opposite from said upper passageway portion and which extends from said first passageway away from said upper passageway portion; and
   b. screw means which are movably engaged in said upper passageway portion and which are movable against said cable means to cause said cable means to be displaced within the lower passageway portion to fixedly connect said drive member to said cable means and to remove any slack in said cable means to maintain said drive members in touching engagement.

* * * * *